United States Patent

Shen

[15] 3,668,194

[45] June 6, 1972

[54] SUSPENSION POLYMERIZATION OF PVC POLYMERS AND COPOLYMERS AT REDUCED TEMPERATURES

[72] Inventor: Pink Kang Shen, Leominster, Mass.

[73] Assignee: Borden, Inc., New York, N.Y.

[22] Filed: Dec. 14, 1966

[21] Appl. No.: 601,557

[52] U.S. Cl. ........................ 260/86.3, 260/78.5, 260/80.81, 260/87.5, 260/92.8
[51] Int. Cl. .................... C08f 3/30, C08f 15/24, C08f 15/06
[58] Field of Search ............ 260/86.3, 87.5, 92.8 W, 78.5 CL

[56] References Cited

UNITED STATES PATENTS

| | | | |
|---|---|---|---|
| 3,057,831 | 10/1962 | Holdsworth | 260/92.8 W |
| 3,244,677 | 4/1966 | Glazer | 260/86.3 |
| 3,180,907 | 4/1965 | Follett | 260/87.5 |
| 3,230,206 | 1/1966 | Albert et al. | 260/87.5 |

*Primary Examiner*—Harry Wong, Jr.
*Attorney*—Jordan J. Driks and John L. Sigalos

[57] ABSTRACT

This invention relates to vinyl chloride polymerization products and to the process of making such products comprising the steps of polymerizing in suspension and at temperatures below about 100° F. monomers consisting of at least 60 percent by weight of vinyl chloride in the presence of an organic peroxy compound, a reducing agent, and a metallic accelerator.

5 Claims, No Drawings

SUSPENSION POLYMERIZATION OF PVC POLYMERS AND COPOLYMERS AT REDUCED TEMPERATURES

This invention relates to a suspension polymerization process for vinyl chloride and vinyl chloride with comonomers therefor, and more particularly to a low temperature suspension polymerization process for said monomers.

Suspension polymerization of vinyl chloride are known. However, these polymerization processes require elevated temperatures for polymerization to proceed at a reasonable rate, as above 120° F.

The instant invention provides a low temperature suspension polymerization process for vinyl chloride and vinyl chloride with comonomers therefor.

Briefly stated, the present invention provides a suspension polymerization process for vinyl chloride and vinyl chloride with comonomers therefor wherein the monomers are interpolymerized in the temperature range from the freezing point of the system up to about 100° F. in the presence of a peroxy catalyst for polymerization, a reducing agent, and an accelerator of suspension polymerization, namely, a divalent metallic ion. The invention will be more fully described in connection with the suspension polymerization process of vinyl chloride in the presence of a peroxy catalyst, sodium bisulphite, and divalent copper ion.

As to materials, the vinyl monomer comonomers of vinyl chloride include vinyl acetate and other lower alkyl esters, $C_1$-$C_8$ alkyl acrylate and methacrylate esters; $C_1$-$C_8$ aliphatic esters of alpha-beta unsaturated di-carboxylic acids such as itaconic acid. Also useful are alpha-chloro acrylic, alpha-bromo acrylic, alpha-fluoroacrylic, and the like acids. Generally, the proportion of vinyl chloride is at least 60 percent by weight. Good results have been obtained with an interpolymer of 90 percent by weight of vinyl chloride and 10 percent by weight of 2-ethyl hexyl acrylate. Peroxy catalyst for ethenoid bond polymerization known in the art are readily used to advantage in this process. Examples include t-butyl peroxy-pivalerate, isopropyl-di-peroxy carbonate, lauryl peroxide, hydrogen peroxide, benzoyl peroxide bis-2-4-dichloro benzoyl chloride, di-1-naphthoyl peroxide, t-butyl hydroperoxide and the like. Also useful are azo-bis-isobutyronitrile and the salts of peroxy-disulfuric acid or otherwise known as water-soluble inorganic persulfates. These include potassium persulfate, ammonium persulfate, sodium persulfate, and the like.

The reducing agent is preferably sodium bisulfite for reason of convenience, however, other water-soluble agents known in the art may be used to advantage. These include ascorbic acid, potassium bisulfite, ammonium bisulfite, sodium sulfite, sodium hydrosulfite and the like.

As to the accelerator of suspension polymerization, the divalent metallic ion, the metals are selected from the group consisting of copper, mercury, barium, calcium, cadmium, zinc, nickel and cobalt. These ions are included in the suspension polymerization medium to best advantage as a metallic salt, as for example cupric chloride, cupric sulfate, cupric acetate, and the like.

Other additives which can be added to the polymerization admixture include suspending agents such as fully and partially hydrolyzed polyvinyl alcohol; polyalkoxyalkylene polyols such as polyoxy $C_1$-$C_4$ alkylene glycols, methyl cellulose, gelatin, hydroxyethyl cellulose, and the like surfactants such as metallic salts of $C_{12}$-$C_{24}$ aliphatic fatty alcohol sulfates, fatty alcohol phosphates, paraffin sulfonate, and the like. Chain modifiers can be included such as carbon tetrachloride, trichloroethylene, benzene, toluene, butyraldehyde and those customarily employed in the art.

The process comprises admixing in an aqueous medium a suspending agent, catalyst, reducing agent, a chain modifier if desired, and the divalent metal ion in the form of its salt. The admixture is maintained in the temperature range below 100° F. and preferably between 50° F. – 70° F. The system is purged of oxygen with nitrogen gas or other non-reactive gas such as carbon dioxide since it has been found that oxygen inhibits this reaction. The monomers are added under agitation conditions and polymerization proceeds in the temperature range stated. The reaction is considered substantially complete when the pressure in the closed system has fallen, as for example, from an initial pressure of about 28 psig at a polymerization temperature of 70° F. to less than 5 psig. Generally, the reaction is substantially complete in about 4 to 24 hours.

The resulting polymer has been found to be of relatively high molecular weight as the relative viscosity of the resin is in the range of about 3.0 – 3.2, as measured in 1 percent cyclohexanone solution.

As to proportions, the monomers consist of at least 60 percent by weight of vinyl chloride. The other additives are used in their usual proportion as shown in Table I.

As to proportions the following table shows proportional ranges of the primary components set forth in columns as Recommended which provide the optimum range of proportions for the best results, and the Illustrative column which provides an expanded range in which the degree of efficiency of the invention is reduced. Proportions greater than the Illustrated range are considered economically unnecessary, and lower than said range are ineffective for the purpose required.

TABLE I

| Material | Parts for 100 parts of Monomers | |
| --- | --- | --- |
| | Illustrative | Recommended |
| Suspending agent | .1–1.0 | .2–.5 |
| Catalyst | .05–.5 | .15–.25 |
| Reducing Agent | .01–.5 | .2–.4 |
| Accelerator | .0005–.003 | .001–.002 |

In the examples that follow and elsewhere herein, proportions are expressed as parts by weight unless specifically stated to the contrary.

EXAMPLE I

Suspension polymers of vinyl chloride and 2-ethyl-hexyl acrylate were prepared in accordance with the preferred method. The polymerization temperature was maintained at about 61° F. and the polymerization time was terminated after 18 hours.

TABLE II

| | 1 | 2 | 3 | 4 | 5 | 6 | 7 |
| --- | --- | --- | --- | --- | --- | --- | --- |
| Water, g | 70 | 70 | 70 | 70 | 70 | 70 | 70 |
| Monomers: | | | | | | | |
|   VCl, g | 28.5 | 28.5 | 28.5 | 28.5 | 28.5 | 28.5 | 28.5 |
|   2-ethyl-hexyl acrylate, g | 1.5 | 1.5 | 1.5 | 1.5 | 1.5 | 1.5 | 1.5 |
| Pluronic F-68,[1] percent on monomer | 0.3 | 0.3 | 0.3 | 0.3 | 0.3 | 0.3 | 0.3 |
| Lupersol 11,[2] percent on monomer | .06 | .06 | .06 | .06 | .06 | .06 | .06 |
| Sodium bisulfite, percent on monomer | | .05 | .50 | .05 | .50 | .50 | |
| $CuCl_2 \cdot 2H_2O$, percent on monomer | .00039 | .00039 | .00039 | .00039 | | | .00039 |
| Results after 18 hrs., percent | (3) | 30 | 80 | 95 | 100 | 10 | (3) |

[1] Pluronic F-68, a polyoxyethylene-polypropylene glycol non-ionic surfactant.
[2] Lupersol 11, a 75% solution of t-butyl peroxy-pivalerate in mineral spirit (catalyst).
[3] No polymer.

From the above results, it can be seen that:
1. Lupersol 11 itself alone cannot induce polymerization at this temperature (No. 1).
2. Lupersol 11 — NaHSO₃ cannot induce polymerization quickly (No. 6).
3. Lupersol 11 — CuCl₂·2H₂O cannot induce polymerization (No. 7).
4. Lupersol 11 — NaHSO₃ — CuCl₂·2H₂O accelerates the polymerization very rapidly (No. 2, 3, 4, and No. 5). With a sufficient level of NaHSO₃ and CuCl₂·2H₂O, polymerization Proceeds to completion while a control does not polymerize at all. (No. 1)
5. Traces of copper is essential in accelerating the reaction. (Nos. 2,3,4, and 5 vs. No. 6).

EXAMPLE II

Suspension polymers as in Example I were prepared at a temperature of 64° F. and 12 hours.

TABLE III

|  | 1 | 2 | 3 | 4 | 5 |
|---|---|---|---|---|---|
| Water, g. | 70 | 70 | 70 | 70 | 70 |
| Monomers, g.: |  |  |  |  |  |
| Vinyl chloride | 30 | 30 | 28.5 | 25.5 | 30.0 |
| 2-ethyl hexyl acrylate |  |  |  |  |  |
| Vinyl acetate |  |  | 1.5 | 4.5 |  |
| Elvanol 50-42, percent on monomer | .25 | .25 | .25 | .25 | .25 |
| IPP, percent on monomer | .06 | .06 | .06 | .06 | .06 |
| NaHSO₃, percent on monomer | .50 | .50 | .50 | .50 |  |
| Trichloroethylene, percent on monomer |  | 1.0 | 1.0 | 1.0 | 1.0 |
| CuCl₂·2H₂O, percent on monomer | .0003 | .0003 | .0003 | .0003 |  |
| Polymer formation, percent | 100 | (¹) | 95 | 95 | 10 |

¹ Blow-up.

EXAMPLE III

Various metallic ions were tried in suspension polymerizations as described in Example I. Polymerization temperature was 100° F. and time was 19 hours. In all runs the following proportions were used:

| Water | 70 gms |
| Vinyl chloride | 24 gms |
| 2-ethyl-hexyl acrylate | 1 gm |
| Surfactant | .15% on monomer |
| Catalyst | .2% on monomer |
| Reductant | .25% on monomer |

TABLE IV

| Metal Ion Source | % on Monomer | Polymer yield |
|---|---|---|
| CuCl₂·H₂O | .00044 | 100% |
| FeCl₂·4H₂O | .0006 | 26% |
| HgCl₂ | .00056 | 45% |
| BaCl₂·H₂O | .00095 | 24% |
| CdCl₂ | .0052 | 25% |
| ZnCl₂ (in HCl) | .0052 | 22% |
| NiCl₂·4H₂O | .0052 | 26% |
| SnCl₄ | .005 | 8% |
| CoCl₂·6H₂O | .0011 | 23% |

It is noted that quadri-valent tin has no significant effect on this process.

The suspension polymers made by this process have utility in areas well-known in the art, as for example in producing plastic products such as sound records, upholstery material, etc. These products are generally made by drying the polymer, blending with a plasticizer, and extrusion or molding to the shape desired.

It will be understood that it is intended to cover all changes and modifications of the examples of the invention herein chosen for the purpose of illustration which do not constitute departures from the spirit and scope of the invention.

I claim:

1. A process for low temperature suspension polymerization of monomers consisting of at least 60 percent by weight of vinyl chloride consisting essentially of the steps of:
   1. combining in an aqueous medium a;
      a. suspending agent;
      b. polymerization catalyst for said monomers selected from the group consisting of organic peroxy compounds and water-soluble inorganic persulphate compounds; and
      c. a divalent metallic ion accelerator selected from the group consisting of copper, mercury, barium, calcium, cadmium, zinc, nickel and cobalt in a proportion between about 0.005 – 0.003 parts by weight of accelerator for 100 parts of monomers, said ions being added in the form of a water-soluble salt; and
      d. a reducing agent,
   2. admixing into said aqueous medium monomers comprising at least 60 percent by weight of vinyl chloride, and
   3. maintaining the temperature in said admixture in the range of above the freezing point of said admixture and up to 100° F. until said monomers are substantially polymerized.

2. The process of claim 1 wherein:
   1. said divalent metallic ion accelerator is selected from the group consisting of copper, mercury, barium, calcium, cadmium, zinc, nickel and cobalt ions;
   2. said monomers are selected from the group consisting of vinyl chloride, and vinyl chloride with monomers selected from the group consisting of lower alkyl vinyl esters, C₁–C₈ alkyl acrylate and methacrylate esters, and C₁–C₈ aliphatic esters of alphabeta unsaturated di-carboxylic acids; and,
   3. said temperature range is between about 50° F – 70° F.

3. The process of claim 1 wherein:
   1. said catalyst is an organic peroxy compound and said reducing agent is sodium bisulfite.

4. The method of claim 2 wherein:
   1. said suspending agent is used in proportion of 0.1–1.0 parts by weight for 100 parts of monomers;
   2. said catalyst is used in proportion of 0.15–0.25 parts by weight for 100 parts of monomers and said reducing agent is used in proportion of 0.01–0.5 parts by weight for 100 parts of monomers;
   3. said metallic ion accelerator is in the form of cupric chloride salt;
   4. said monomers consist essentially of vinyl chloride and 2-ethyl-hexyl acrylate; and
   5. said temperature range is between about 50° F–70° F.

5. The process of claim 1, wherein the metallic ion accelerator is copper.

* * * * *

UNITED STATES PATENT OFFICE
CERTIFICATE OF CORRECTION

Patent No. 3,668,194              Dated    Jun 6, 1972

Inventor(s)    Ping Kang Shen

It is certified that error appears in the above-identified patent and that said Letters Patent are hereby corrected as shown below:

Column 1, line 3, beginning with "This invention relates" cancel all to and including "said monomers." in line 6, same column 1.

Signed and sealed this 26th day of September 1972.

(SEAL)
Attest:

EDWARD M. FLETCHER, JR.                ROBERT GOTTSCHALK
Attesting Officer                      Commissioner of Patents